FIG. 9

3,288,821
BROMINATED AND CHLORINATED AMIDES AND PROCESS FOR MAKING SAME

Vincent P. Kuceski, Chicago Heights, Ill., assignor to The C. P. Hall Company of Illinois, Chicago, Ill., a corporation of Ohio
Filed June 7, 1963, Ser. No. 286,224
16 Claims. (Cl. 260—404)

This invention relates to brominated N-substituted amides derived from naturally occurring unsaturated fatty acids. The amides preferably contain an even number of bromine atoms added at the double bonds in the unsaturated fatty chain. If there is more than one double bond, the double bonds need not all be saturated.

On bromination, some of the molecules of a particular amide constituent may be brominated to a greater extent than other molecules, whether only that amide is present or whether a mixture of amides is present. Amides from naturally occurring alkanoic acids and alkynoic acids may be present with the amides of alkenoic acids unless they are separated from these others before amidation.

Bromination may be followed by chlorination in order to more completely halogenate a mixture of amides. In such products some of the amides will contain only bromine atoms, and others will contain both bromine and chlorine.

Thus, the invention relates to brominated N-substituted amides of the following formula:

in which R is a fatty chain of a naturally occurring fatty acid bromiated with an even number of bromine atoms, R' is selected from the class consisting of hydrogen and alkyl groups containing 1 to 4 carbon atoms and R" is an alkyl group which contains 1 to 8 carbon atoms, the total number of carbon atoms in R' and R" being not over 8.

The invention relates to certain individual brominated amides but is not limited thereto. It includes compositions composed of a mixture of brominated amides, and compositions composed of brominated amides mixed with unbrominated amides, whether saturated or unsaturated.

The amides in which R' and R" are each methyl are preferred because they are lower melting, more soluble in organic systems and more compatible therewith than mono-substituted amides and amides of greater carbon content in the amide substituents; the longer the substituent chains, the lower the molar bromine content. Therefore, N-substitution with more than a total of eight carbon atoms is not desirable in amides used as flame retardants.

The compounds of this invention are chiefly valuable as flame retardants for use in plastics. To be effective for this purpose, about 3 to 15 percent or more of bromine must be present, based on the weight of the final product. This may require the use of up to 50 percent or more of the brominated amide, depending upon its bromine content. For use as a flame retardant, the brominated amide must have a boiling point of at least 250° C. at atmospheric pressure, and a boiling point of 275° C. or even 300° C. or more may be desirable. There are two considerations important in connection with this use. The first is the mechanism of the burning process. The large size of the bromine molecule accomplishes the most important function necessary to retard combustion; that is, the absorption of heat energy. It absorbs the heat necessary to propagate combustion. The second consideration is the physical barrier of the bromine to oxygen penetration. Chlorine does not possess this property to anywhere near the same degree.

It is important that the amide include at least one N-substituent. This contributes compatibility to the compound so that the compound is compatible with a wide variety of thermoplastic organic polymers, etc. It makes the amides unusually substantive to polar-type polymers, thus decreasing their extractability. The amides are stable to heat and light under a wide variety of conditions. They are also stable to hydrolysis and moisture and are resistant to mold and fungi.

In order to obtain one or more of the foregoing beneficial results to the utmost degree, it is often desirable to utilize an N,N-disubstituted amide. On the other hand, the molar bromine content of an amide is lowered by utilizing a disubstituted amide rather than a mono-substituted amide. In order to minimize the dilution of the plastic to which the flame retardant is added, the lower molecular weight substituents on nitrogen are preferred, so ordinarily the methyl or dimethyl amides will be preferred to those containing longer substituent groups.

The flame retardants can be added to cellulosic plastics, polyethylene, nylon, polyesters, rubber and other elastomers, films, coatings, spun fibers, plastic moldings, castings, adhesives, and may be used in the impregnation of wood, paper, cotton cloth, etc. A bromine content of at least about 25 or 30 percent or more is generally required in a flame retardant. It may be incorporated directly in the plastic prior to spinning or other fabrication. The brominated amides are also useful as pigment deflocculants in paints, gasoline additives, lubricant additives, insecticides, as insect repellants, pesticides, pest repellants, moldicides, fugicides, drug additives (as for example in the treatment of skin and hair conditions), cosmetics (as for example in the treatment of acne and other skin disorders), etc. They are synergists and solvents for drugs, insecticides and insect repellants (as for example to increase the potency of DDT, Servin, N,N-diethyl toluamide, etc.), etc. They facilitate the removal of gasses in molten metal processing, and are useful as deemulsifiers, as fire-resistant hydraulic fluids and other heat-transfer media, anti-blocking agents, mold releases, slimicides, anti-static agents, solubilizers for dyes, antioxidants, anti-ozonants, and as cutting and drawing compounds. They are useful for the treatment of woods and seeds, and in the treatment of drilling muds, etc.

Their valuable properties include their polarity and outstanding compatibility with organic systems, their freedom from odor, their low vapor pressure, and the fact that the bromine is present in a form that is generally non-corrosive. Most of the brominated amides are liquid, and this facilitates their incorporation in plastics, etc.

Compounds representative of the invention include N,N-dimethyl, diethyl, di-n-propyl, di-i-propyl, di-n-butyl, di-sec-butyl, monomethyl, monoethyl, monopropyl, monobutyl, monoamyl, monohexyl, monoheptyl and monooctyl amides of 9,10-dibromostearic acid from oleic acid
12,13-dibromo 9,10-oleic acid from cis- and trans-linoleic acid
9,10,12,13-tetrabromostearic acid from cis- and trans-linoleic acid
9,10,12,13,15,16-hexabromostearic acid from cis- and trans-linolenic acid
9,10-dibromo, 12-hydroxy-octadecanoic acid from ricinoleic acid
12,13,15,16-tetrabromostearic acid from cis- and trans-linolenic acid
15,16-dibromo-delta 9,10,12,13-linoleic acid from cis- and trans-linolenic acid
12,13,15,16-tetrabromo-delta 9,10-oleic acid from cis- and trans-linolenic acid 9,10-dibromo arachidic acid from cis- and trans-gadoleic acid 13,14-dibromobehenic acid from erucic acid Dibromo-, tetrabromo-, and hexabromo- derivatives from elaeostearic acid (9,10,11,12,13,14 - octadectrienoic acid)

Dibromo-, etc. derivatives from arachidonic acid (5,6,8,9, 11,12,14,15-eicosatetraenoic acid)

Dibromo-, etc. derivatives of clupanodonic acids

Dibromo-, etc. derivatives of licanic acid

The acids from which the foregoing brominated amides are obtainable include:

Oleic, linoleic and linolenic acids from many fats and oils
Ricinoleic acid from castor oil
Erucic acid from rapeseed oil
Elaeostearic acid from tung oil
Arachidonic and clupanodonic acids from fish fats and oils
Licanic acid from oiticica oil The brominated amides are preferably obtained by bromination of an unsaturated amide, although the acid might be brominated before amidation. Commercially, the brominated amides are generally of the foregoing formula in which R contains 17 carbon atoms, but they may be derived from a fish oil or fish oil fraction which contains a substantial amount of acid containing 20, 22, 24 or more carbon atoms.

The substituted amides may be made by any usual procedure. The nitrogen substituent or substituents may be the same or different.

The invention is illustrated by the following examples.

EXAMPLE I

*9,10-dibromo-N,N-dimethylstearamide*

A technical grade of the above compound was made as follows:

(A) Preparation of amide from technical grade of methyl oleate having the following analysis:

| | Percent |
|---|---|
| Methyl myristate | 3.7 |
| Methyl myristoleate | 1.8 |
| Methyl palmitate | 5.2 |
| Methyl palmitoleate | 6.6 |
| Methyl stearate | 0.3 |
| Methyl oleate | 75.8 |
| Methyl linoleate | 5.6 |

This had an iodine number of 88, a saponification number of 191 and an acid number of less than 2.0 mgs. of KOH per gram.

Five thousand nine hundred seventy-five pounds of this methyl oleate was charged to the reactor. It was heated to 120° C. under a vacuum and agitated to remove the water. After cooling to 40° C., 141 pounds of 25 percent sodium methylate solution was added and then the addition of 1000 pounds of dimethyl amine was begun. The addition of the amine caused the temperature to rise to 57° C. over a period of 8 hours, when the amine addition was completed. Agitation was continued for another 8 hours. Then the sodium methylate was neutralized with dilute sulfuric acid. The batch was stripped of methanol and excess amine, and then filtered, and then distilled in a molecular still at 180–220° C. at 100–500 microns Hg pressure.

(B) Bromination of amide.

One thousand grams of the above amide mixture was placed in a 3-necked flask provided with stirrer, thermometer, and inlet funnel through which bromine was later added. Three hundred milliliters of methanol was added and mixed with the amide. The flask was cooled to 10° C. and below, preferably 0° C. or −10° C., while 581 grams of bromine was added. Good agitation was provided to assist in dissipating the large amount of heat that was evolved in order to prevent the formation of color bodies.

The methanol originally added suppresses the formation of color bodies and free fatty acids, and aids in maintaining good color. Other water-soluble, liquid alcohols and glycols, and preferably ethyl, propyl or butyl alcohol or an isomer thereof, or ethylene glycol, diethylene glycol, triethylene glycol, propylene glycol or dipropylene glycol may be used.

The product was washed with water and then with 5 percent $Na_2CO_3$ solution until neutral to phenolphthalein indicator. Chloroform was added to aid in separation of water and oily phases, although other solvents may be used to aid in the separation. Other alkaline solutions may be used as NaOH, $NaHCO_3$, $NH_4OH$, etc.

Figure 1:
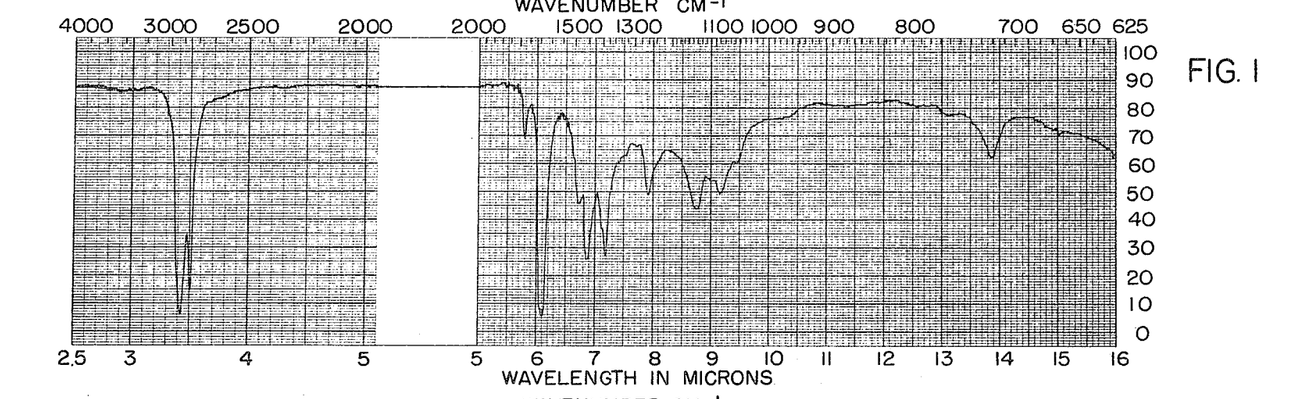

Discoloration may occur if temperatures higher than about 50° C. are used when stripping off solvent and water. Stabilizers such as epoxy compounds, etc. may be added to prevent this. The product obtained is a yellowish liquid. It is mostly cis-9,10-dibromo-N,N-dimethyl stearamide, a liquid. It may contain appreciable amounts of trans-isomer since it has no definite freezing point. Analysis showed that this commercial product contained about 5 percent of free methyl ester caused by partial amide breakdown to form an intermediate which reacted to give the brominated methyl ester. The commercial product had a specific gravity of 1.1869 at 25° C./25° C.; 1.1839 at 60° C./60° C. and 1.1804 at 70° C./70° C. It had the following analysis: Br=37.7%; N=3.12%; C and H=63.12%. The infra-red curve is shown in FIGURE 1.

EXAMPLE II

*9,10-dibromo and 9,10,12,13-tetrabromo N,N-dimethyl stearamide*

To form the brominated substituted amides of this example, an amide composition of the following analysis was used:

| | Percent |
|---|---|
| N,N-dimethyl palmitamide | 8 |
| N,N-dimethyl oleamide | 26 |
| N,N-dimethyl linoleamide | 56 |
| N,N-dimethyl linolenamide | 6 |
| Other saturated amide and esters | 4 |

Its iodine value is about 125.3. The material was made from a fraction of soyabean fatty acids having approximately the same composition calculated as the methyl esters rather than the amides.

The brominated compounds were made by cooling a mixture of 4000 grams of the above amides with 1320 grams of methanol to 20° C. at the start, and then as bromine is added with vigorous agitation the temperature was lowered to 15° C. and finally to as low as −10° C., although higher temperatures are more practical and even necessary when higher bromides than the tetrabromide are formed in the reaction. Since the higher bromides tend to precipitate from solution during the reaction the rate of the reaction is adjusted by running bromine in until the solution has no more red than an orangered cast. This prevents or helps prevent side reactions from occurring, such as decomposition of the amide group or substitution reactions on the chain rather than addition reaction of bromine to an unsaturated bond. A total of 3269 grams of bromine was added. Theory gives 44.2 percent as a possible bromine content. However, in this instance a series of four runs gave only 41.03 percent of bromine, which may have been due to various factors such as stearic hindrance or the low temperature employed.

Alcohol such as methanol is added to decrease the formation of free fatty acids or other derivatives which interfere with the washing and purification steps. Ester formed in this way does not interfere with the washing or purification process whereas any free carboxylic acid having 8 to 18 carbon atoms will give emulsification and foaming difficulties.

The product obtained had the following analysis:

| | |
|---|---|
| Bromine, percent | 41.03 |
| Specific gravity 60° C./60° C. | 1.3182 |
| Specific gravity 70° C./70° C. | 1.3149 |

Figure 2:
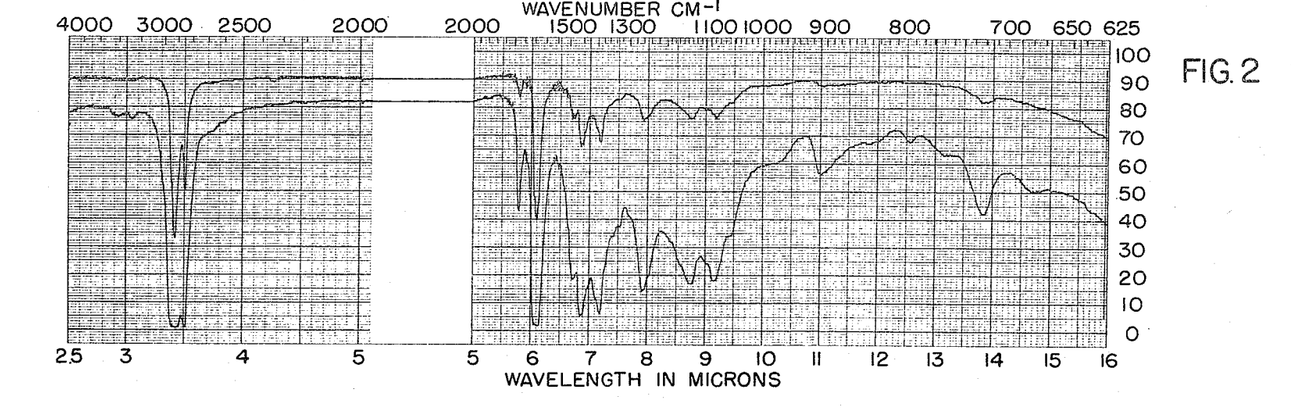

It was a semi-liquid which became completely liquid at about 60° C. Its infra-red analysis is shown in FIGURE 2.

The product consists of both cis- and trans-isomers of the di- and tetra-bromides with small amounts of the hexabromides. There are two isomers of the di-bromide and four of the tetra-bromide (two being optical isomers of the other two). The fact that the products are most liquid indicates that they are in the lower melting cis forms. However, certain higher melting forms can be isolated.

To determine if higher melting derivatives actually exist, a small amount of solid material, about 15 grams, was filtered off of 225 grams of the semi-liquid at room temperature. The solid was boiled with petroleum ether and while still hot, filtered and washed; the crystals remaining weighed about 5 grams. These were washed with petroleum ether and dried. The material, N,N-dimethyl hexabromostearamide, was analyzed for bromine and found to contain 59.87 percent. Theory for N,N-dimethyl hexabromostearamide is 61.1 percent bromine. The melting point was 136.5–138.7° C.

The filtrates from the petroleum ether solutions were cooled to 0° C. and then filtered at 0° C. and washed with cold petroleum ether (B.P. 40–60° C.). The dried crystals which were N,N-dimethyl tetrabromostearamide were analyzed and found to contain 49.40 percent bromine; theory for N,N-dimethyl tetrabromide is 51.08 percent bromine. The melting point was found to be 51–52.5° C.

The above crystalline products represents the higher melting isomers. The liquid isomers remaining usually have poor crystallizing forms resulting in viscous amorphous solids or glasses.

EXAMPLE III

*Commercial N,N-dimethyl tetrabromostearamide and N,N-dimethyl hexabromostearamides*

This mixture was made from a starting mixture of linseed fatty acids which were made into the butyl esters before conversion to the amides. The mixture which was obtained contained about 95 percent of amides of dimethyl amine with an analysis as follows:

| Analysis of amide mixture: | Percent |
|---|---|
| N,N-dimethyl palmitamide | 6.0 |
| N,N-dimethyl stearamide | 2.0 |
| N,N-dimethyl oleamide | 18.0 |
| N,N-dimethyl linoleamide | 23.0 |
| N,N-dimethyl linolenamide | 46.0 |
| Butylesters of fatty acids | 5.0 |
| Average iodine number, 159.3. | |

In this example both methanol and isopropanol were used as a diluent. To 2724 grams of the above amide mixture was added 898 grams of methanol and the reaction mixture was cooled down to −15° C. Agitation was started and bromine added as fast as possible without causing the temperature to rise above about −5° C. When about 1300 grams of bromine had been added, crystalline products began to precipitate and the temperature was allowed to rise to 7° C. When 1988 grams of bromine had been added the precipitated solids became so heavy that about 600 grams of isopropyl alcohol was added to dissolve the precipitate. Crystals were still present in abundance at 7° C. when the bromine addition was discontinued after adding 2724 grams of bromine over a period of 8 hours. This should give a bromine content of 50 percent, but because of vaporization losses, stearic hindrance, and other losses this could not be realized. The theoretical bromine content attainable with these amides with an iodine value of 159.3 is 50 percent.

The product containing methanol, isopropanol, some free bromine, etc. was first washed with warm water, separated from the water layer and then an equal weight of 1,1,1-trichlorethane was used to aid in the separation of the phases when the mixture was later washed with a $Na_2CO_3$ solution in water.

The product was put under vacuum and stripped until a temperature of 50° C. was reached under absolute pressure of 50 mm. Hg. Then, in order to decrease the time necessary to strip the product of solvent, the temperature was increased to 75° C. However, to prevent discoloration 1.4 percent (based on the weight of the amide) of epoxidized soyabean oil (Swift's Epoxol 9–5) having an oxirane content of 9 epoxy groups per molecule was added to inhibit color formation. The resulting product, free of volatiles was analyzed and found to have the following analysis:

| | |
|---|---|
| Bromine, percent | 47.28 |
| Specific gravity at 70° C./70° C. | 1.3277 |

Figure 3:
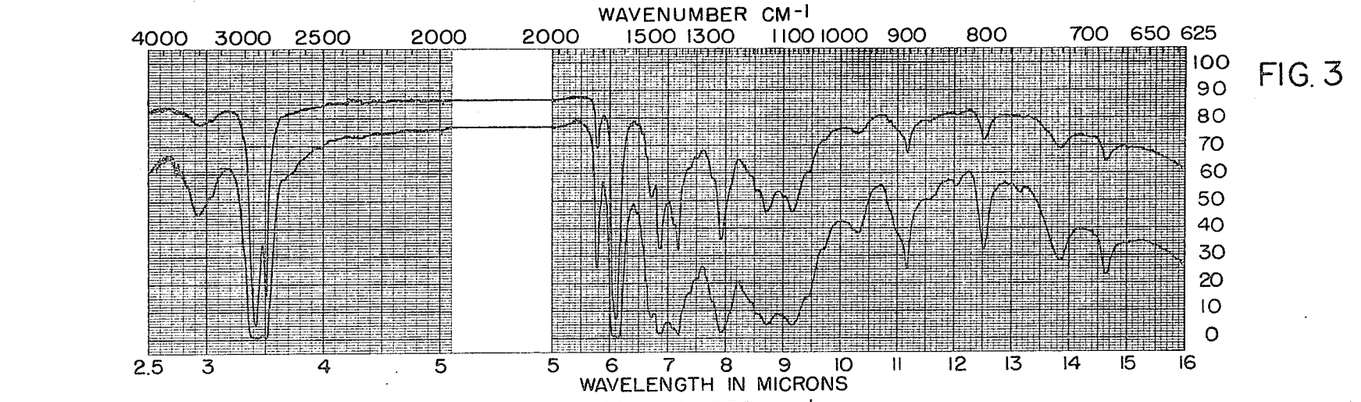

The mixture of N,N-dimethyl tetrabromostearamide and N,N-dimethyl hexabromostearamide obtained in this way was semi-liquid at room temperature, having more solids in suspension than the material derived from soyabean fatty oils. Its infra-red spectrum is shown in FIGURE 3.

A solid material was isolated from this product by petroleum ether extraction. This gave a solid crystal having a melting point of 140° C. and a bromine content of 59.13 percent. It is similar in all respects to the N,N-dimethyl hexabromide described in Example II which has a bromine content of 59.87 percent.

EXAMPLE IV

*Pure N,N-dimethyl 9,10-dibromostearamide*

A pure N,N-dimethyl 9,10-oleamide was brominated in a manner similar to Example I. The oleamide was made from a sample of triolein containing only a few percent of trans-isomer. Twenty grams were brominated in 125 ml. of methanol at a temperature below 0° C. The bromine was added slowly over a period of 4 hours, no great excess being present at any time. The product was washed and stripped as described previously, except that no stabilizer was added and therefore the stripping was done below 50° C. The product obtained was a yellowish liquid having a net weight of 25 grams. No effort was made to obtain theoretical yields since the object was to prepare a pure compound. The product obtained was, of course, a mixture of isomers because of the small amount of trans-isomer present. However, the product could be considered as at least 90 percent N,N-dimethyl 9,10-dibromostearamide in the cis-form. Because of the unavoidable side reaction 5 percent of the brominated compound is the methyl ester.

The analysis shows the following:

| | |
|---|---|
| Bromine [1], percent | 35.67 |
| Melting pt.[2], ° C. | 36 |
| Sp.G. at— | |
| 25° C./25° C. | 1.1675 |
| 60° C./60° C. | 1.1557 |
| 70° C./70° C. | 1.1540 |

[1] Theory=34.0%.
[2] Sets to glass below −24° C.

Figure 4:
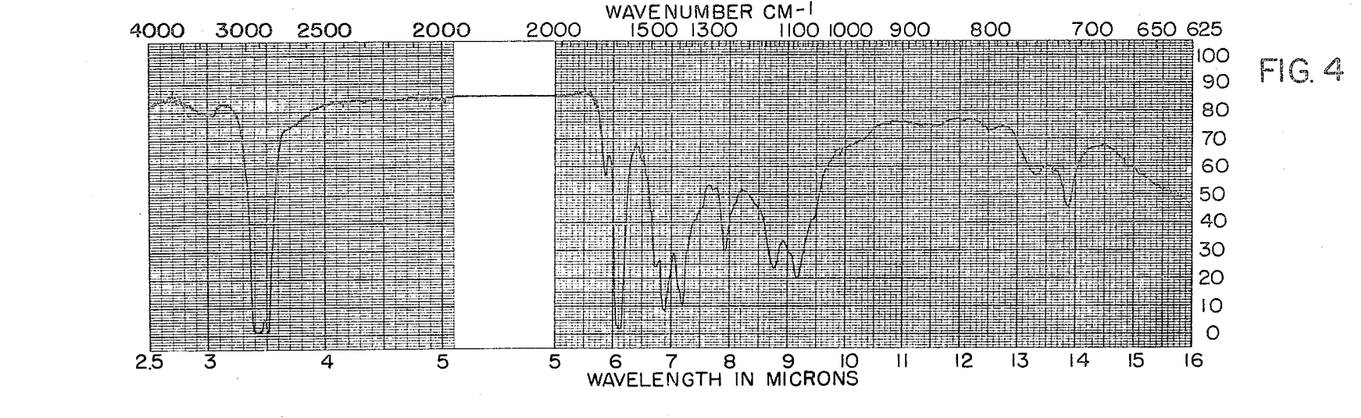

The infra-red spectrum also shows the presence of a small amount of methyl ester. This is shown in FIGURE 4. A small amount of hydroxyl also seems to be indicated signifying the presence of a small amount of mono- and di-glycerides.

EXAMPLE V

*Pure N,N-dimethyl 9,10,12,13-tetrabromo-stearamide*

Trilinolein was prepared from the methyl esters of pure linoleic acid having only a minor amount of trans-isomers. The amides and then the bromine compounds were prepared in the manner previously described. The product was a liquid having a very small amount of solids suspended in it. These solids are possibly the higher melting isomers of N,N-dimethyl 9,10,12,13-tetrabromo-stearamide. The product finally obtained, which was essentially a mixture of stereo-isomers of N,N-dimethyl 9,10,12,13 - tetrabromo - stearamide, had the following analysis:

| | |
|---|---|
| Bromine,[1] % | 47.98 |
| Melting pt.,[2] ° C. | 24 |
| Sp. G. at— | |
| 25° C./25° C. | 1.3536 |
| 60° C./60° C. | 1.3354 |
| 70° C./70° C. | 1.3377 |

[1] Theory=51.08.
[2] Turns to a viscous solid.

Figure 5:
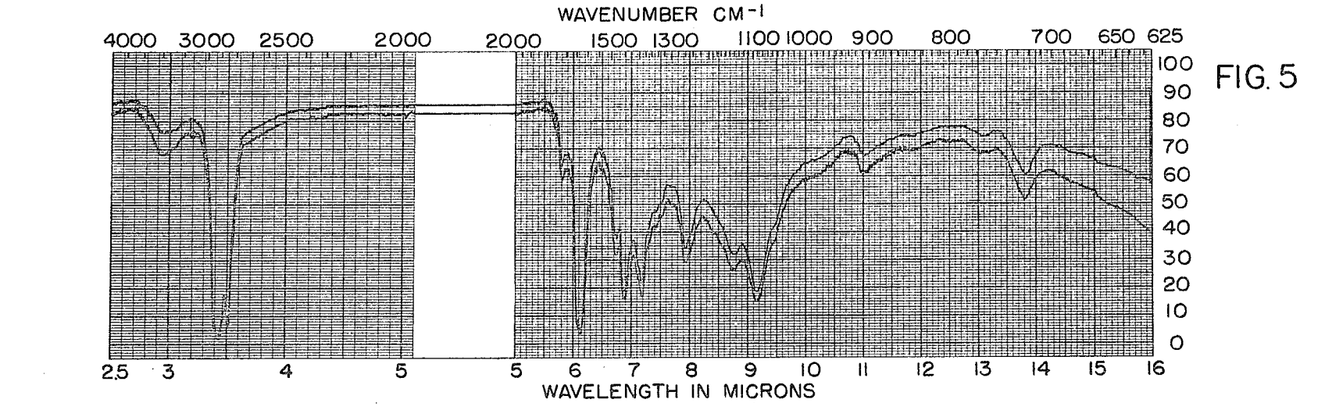

The product contains a small amount of ester as shown by the infra-red spectrum in FIGURE 5.

EXAMPLE VI

*N,N-dimethyl 12, 13-dibromo, 9,10-dichlorostearamide, (brominated and chlorinated soyabean amide)*

A mixed halogen amide was prepared to give a liquid product of relatively low viscosity. To accomplish this the halogens were added in two steps. The bromine was added first to saturate the double bonds farthest from the amide group to make the N,N-dimethyl 12,13-dibromo, 9,10-oleamide and to make a small amount of the N,N-dimethyl 15,16; 12,13-tetrabromooleamide. Chlorine was then added to saturate the remaining double bonds.

To a solution in 125 grams of emthanol (anhydrous) of 253 grams of this N,N-dimethyl amide derived from soyabean oil of the composition given in Example II, having an iodine value of 125.3, were slowly added at —5° C. 83 grams of bromine over a period of one hour. This amount of bromine theoretically satisfies 45.7 percent of the unsaturated bonds in the mixture. Then gaseous chlorine was added to saturate most of the remaining double bonds both on brominated and unbrominated molecules. Fifty-three grams of chlorine were added although only 44 were required to furnish the amount necessary to saturate.

Using this method of addition of halogen it is calculated that the bromine added to the linolenamide and linoleamide in appreciable quantities before any added to the oleamide. Thus, since the unsaturation in the N,N-dimethyl linolenamide and the N,N-dimethyl linoleamide comprise 83 percent of the unsaturation in the mixture the bromine must have reacted to form the following compounds before any appreciable quantity of N,N-dimethyl hexabromo (9,10,12,13,15,16) stearamide or N,N-dimethyl tetrabromo (9,10,12,13) stearamide was formed:

N,N-dimethyl 15,16-dibromo linoleamide
N,N-dimethyl 15,16,12,13-tetrabromoleamide It is theorized that the following compounds were present after the bromine addition was completed. This computation is based on the addition of bromine to the different unsaturated amides based on the total amount of unsaturation in each molecule. That is, the addition of bromine would be proportional to the unsaturation in each molecule, assuming the speed of addition to be the same for each type of unsaturation. The table gives the amount in percentages of compound formed both before and after bromination of 253 grams of the amide mixture with 83 grams of bromine.

| Amide | Percent Composition | |
|---|---|---|
| | Before Bromination | After Bromination |
| N,N-dimethyl palmitamide | 8.0 | 6.0 |
| N,N-dimethyl oleamide | 26.0 | 11.4 |
| N,N-dimethyl 9,10-dibromo stearamide | | 12.2 |
| N,N-dimethyl 12,13-dibromooleamide | | 52.8 |
| N,N-dimethyl linoleamide | 56.0 | 7.4 |
| N,N-dimethyl 15,16-dibromo linoleamide | | 5.6 |
| N,N-dimethyl 15,16,12,13-tetrabromo oleamide | | 1.5 |
| N,N-dimethyl linoleanamide | 6.0 | 0.0 |
| N,N-dimethyl amides of other saturated acids; esters | 4.0 | 3.0 |
| Total | 100.0 | 99.9 |

Thus, when the above unsaturated compounds are completely saturated we would expect the following compounds to form in these approximate amounts:

| | Percent |
|---|---|
| N,N-dimethyl palmitamide | 5.3 |
| N,N-dimethyl 9,10-dichlorostearamide | 12.3 |
| N,N-dimethyl 9,10-dibromostearamide | 10.7 |
| N,N - dimethyl 12,13 - dibromo, 9,10-dichlorostearamide | 53.3 |
| N,N-dimethyl 9,10,12,13-tetrachlorostearamide | 7.8 |
| N,N-dimethyl 15,16, dibromo, 12,13,9,10-tetra chlorostearamide | 6.4 |
| N,N-dimethyl 15,16,12,13-tetrabromo 9,10-dichlorostearamide | 1.5 |
| N,N-dimethyl saturated amides | 2.6 |
| | 99.9 |

Analysis of the product after both bromination and chlorination had been carried out showed the presence of halogen calculated as bromine to be 41.81 percent. However, the actual analysis based on the known amount of bromine and chlorine added is

| | |
|---|---|
| Bromine, percent | 24.7 |
| Chlorine, percent | 11.6 |
| Total halogen, percent | 36.3 |
| Specific gravity at 25° C./25° C. | 1.1826 |

Figure 6:
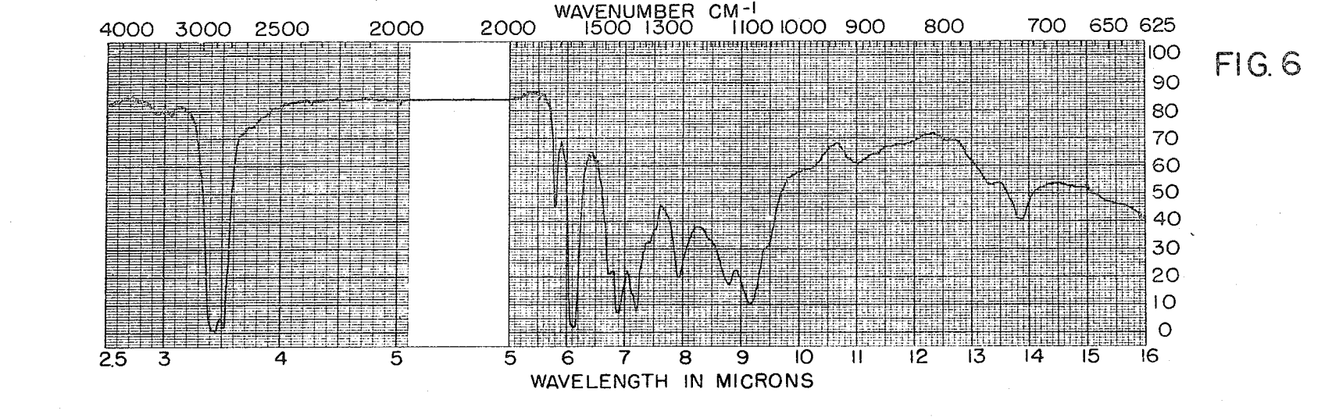

The infra-red spectrum is shown in FIGURE 6.

EXAMPLE VII

*N-methyl 9,10-dibromostearamide*

Two hundred grams of technical N-methyl oleamide was prepared from technical oleic acid and N-methyl amine, and brominated in solution in 300 ml. of methanol with 122 grams of bromine at a temperature of 0 to 10° C. The product was taken up in 200 ml. of chloroform and washed with warm water to remove any unreacted bromine. It was then washed with 5 percent NaOH solution and then with water until the washings were neutral to litmus paper. The chloroform solution was then stripped to remove chloroform and water at a temperature of 50–60° C. and a vacuum of 20 mm. Hg. The resulting product was a yellow viscous liquid, and had the following analysis:

| | |
|---|---|
| Bromine, percent | 30.43 |
| Sp. Gr. at 70° C./70° C. | 1.1816 |

Figure 7:
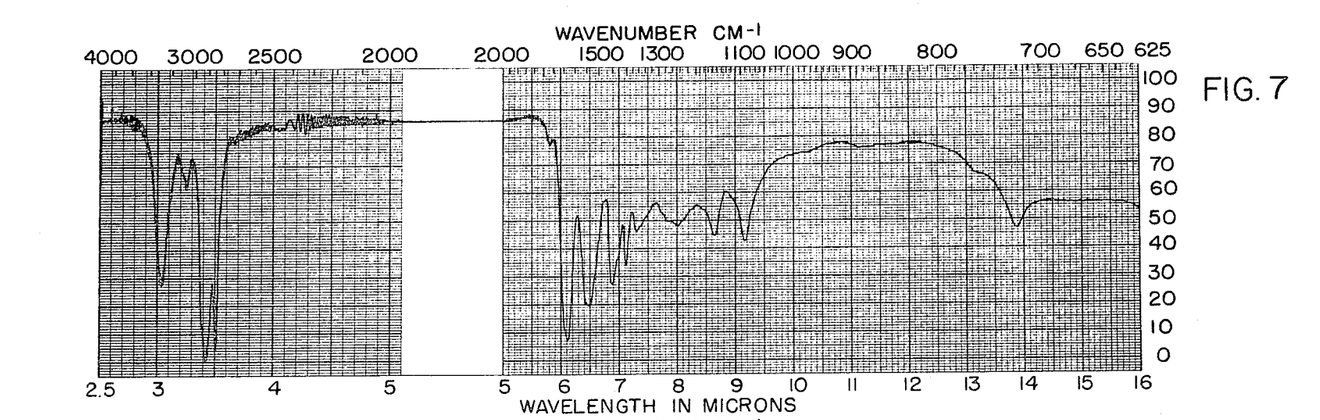

The infra-red spectrum is shown in FIGURE 7.

EXAMPLE VIII

*N,N-dimethyl 9,10,12,13,15,16-hexabromostearamide*

This compound was made from a pure methyl linolenate having an iodine value of 260 with a diene conjugation of 0.15 percent. Its purity was estimated at 99 percent or more by gas-liquid and paper chromatography. It was converted to the dimethyl amide by previously described methods, except that a large excess of catalyst and dimethyl amine was used to drive the reaction to completion, and the catalyst and excess amine were removed by washing with warm water and then dried.

Five grams of this N,N-dimethyl linolenamide was dissolved in 25 ml. of methanol at 0° C. and then bromine was added drop by drop with vigorous agitation until the solution started showing a deeper yellow color. The addition of bromine was slowed until no more bromine could be added to the mixture without a much deeper color resulting. The temperature was never allowed to rise above 5° C.

Figure 8:
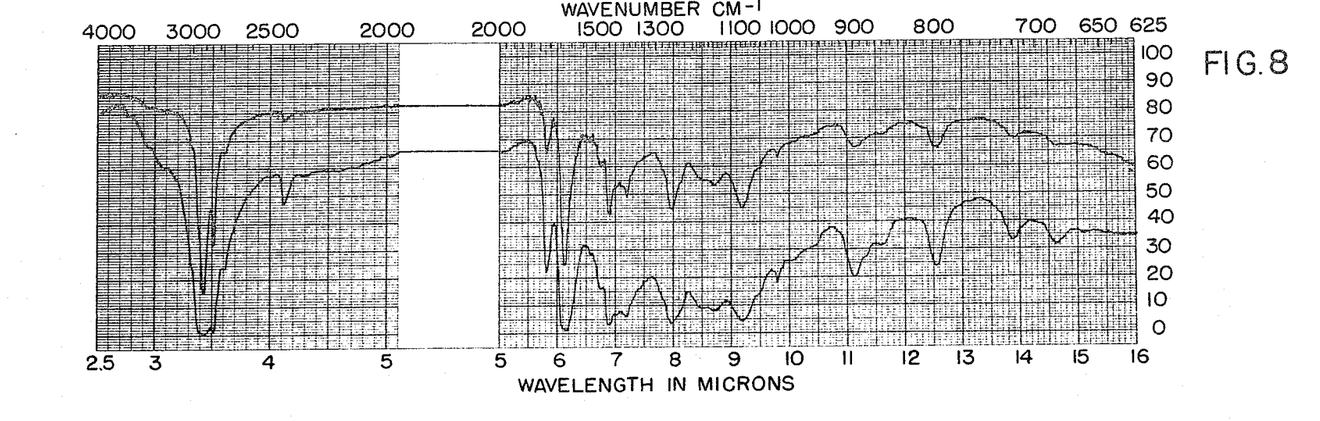

The product was taken up with 50 ml. of isopropyl ether and washed once with warm water. Then 100 ml. of 5 percent $Na_2CO_3$ solution was added and the mixture was shaken vigorously in a 500 ml. separatory funnel. The ether layer was then washed repeatedly with distilled water and the product was stripped at 40–50° C. for several hours to remove volatiles. Its analysis shows 50.95% Br, and its infrared spectrum is shown in FIG. 8.

EXAMPLE IX

*Brominated N-octyl amides of codfish oil fatty acids*

This is an example containing both the longer chain fatty acid moiety as well as the longer chain nitrogen substituent wherein a major portion of the longer chain fatty acids are unsaturated and are then saturated with bromine to make brominated N-octyl fatty amides.

Codfish oil contains the following fatty acids:

| Acid | Percent | Carbon Atoms |
|---|---|---|
| Myristic | 5.8 | 14 |
| Palmitic | 8.4 | 16 |
| Stearic | 0.6 | 18 |
| Myristoleic | 0.2 | 14 |
| Palmitoleic-Palmitolinoleic | 20.0 | 16 |
| Oleic-linoleic | 29.1 | 18 |
| Eicosadienoic, Gadoleic, Eicosatrienoic and Arachidonic | 25.4 | 20 |
| Docasatetraenoic, Docasatrienoic and Clupanodonic | 9.6 | 22 |
| Unsaponifiable | 0.9 |  |
|  | 100.0 |  |

The codfish oil from whence these acids are obtained have an iodine value of 161.8 and a saponification number of 182.5.

The N-octyl amides were obtained by a method in general previously described. The product, a mixture of N-octyl amides of the above fatty acids was brominated as follows:

Fifteen grams of the product were dissolved in 100 ml. of $CHCl_3$ and then 25 grams of bromine was added to insure a large excess of bromine in case bromination of the multiple double bonds (4 to 5) was slow. The temperature was kept below 10° C. during the bromination, and the reaction mixture was well agitated. The reaction mixture was then washed with cold water, then with 10 percent $Na_2CO_3$—KOH solution until neutral to phenolphthalein indicator. Difficult emulsions were formed which could only be overcome by using large quantities (500 ml.) of water-methanol and benzene. The product in the benzene layer was stripped of volatiles and then analyzed. Bromine=39.96%; C=47.2%; H=8.29%; N=2.04%; M.P. 100–110° C.

Figure 9:
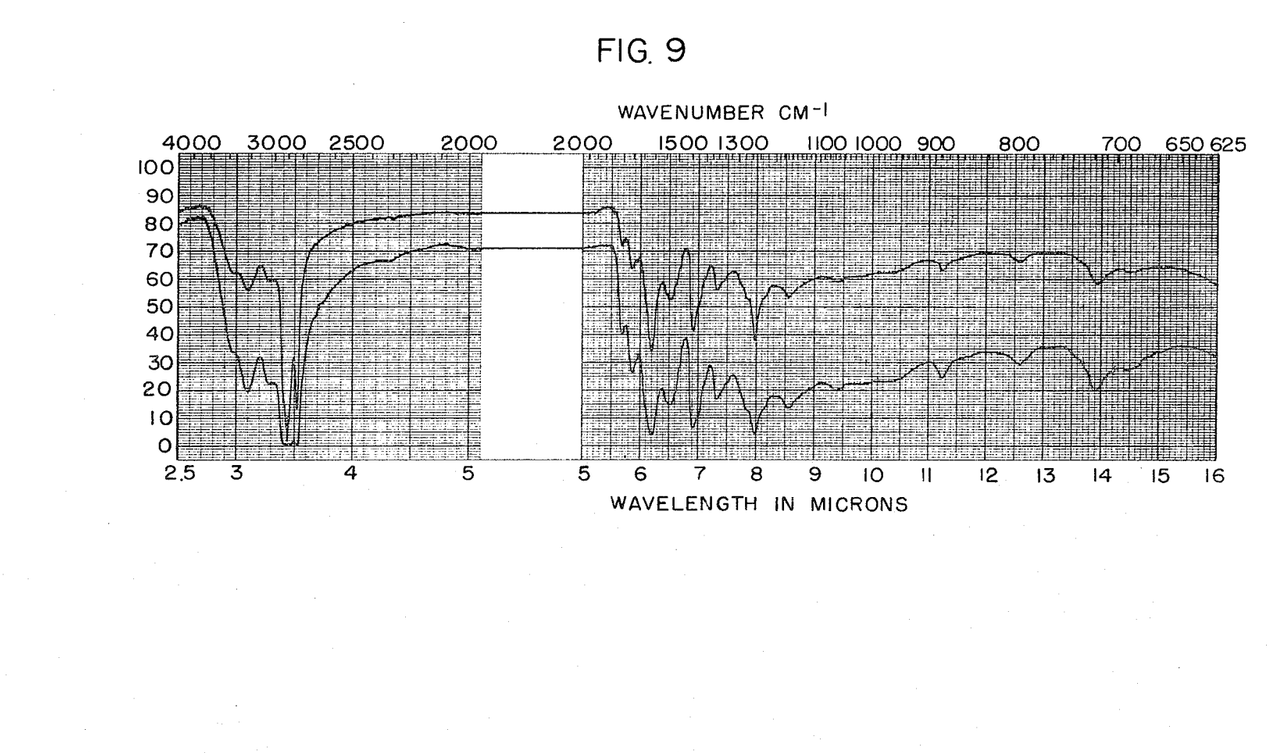

An infra-red curve (FIGURE 9) shows the characteristic amide group and free hydrogen on the nitrogen.

This material very likely would not find wide usage in polymers because of its high melting point. Ordinarily, we would desire a liquid product to facilitate handling. The lower molecular weight amines would be more useful here in forming the amides from fish oil fatty acids. This example is given to show the range of possibilities.

Other N,N-disubstituted amides of brominated, naturally-occurring fatty acids and mixtures containing them, together with admixtures with unbrominated amides of such acids are obtainable by procedures similar to those set forth in the foregoing examples, using pure fatty acids and mixtures thereof such as are found in nature, and in commercial products derived from natural mixtures. The positions of the bromines in the chains depend upon the positions of the double bonds prior to bromination, and whether there is any shift of the double bonds.

EXAMPLE X

*Flexible urethane foam with fire retardant*

A standard urethane foam formulation was used:

Order of addition: Parts
1. Niax triol LG–56 [1] _________________ 100.0
3. Mondur TD–80 [2] _________________ 38.0
1. Silicone L–520 [3] _________________ 0.5
2. Dabco [4] _________________ 0.075
2. N-ethyl morpholine _________________ 0.2
1. Dibutyl tin di(2-ethylhexoate) _________ 0.2
2. Water _________________ 2.9

[1] Propylene adduct to glycerine having the following properties:
Average molecular weight _________________ 3000
Hydroxyl number _________________ 56
Specific gravity (20° C./20° C.) _________ 1.009
Viscosity at 20° C. (cps.) _________________ 600
C.O.C. flash point, ° F. _________________ 445
[2] Toluene diisocyanate.
[3] Water-soluble silicone oil made according to Example 1(A) of Bailey et al. U.S. 2,834,748.
[4] Triethylene diamine.

To this mixture there was added four different amounts of the brominated amide of Example II, to produce four samples referred to below as Examples 6A, 6B, 6C and 6D. In the first run, 20 grams of a mixture of N,N-dimethyl 9,10-di- and 9,10,12,13-tetrabromo amides was added to 100 grams of Niax Triol LG–56 and mixed thoroughly. Then this, along with the other items marked No. 1, as added first, were mixed intimately with items marked No. 2. The di-isocyanate marked No. 3 was then added and the whole was mixed thoroughly for 10 seconds. The mixture was then poured into a mold just before foaming began. The resulting foam after curing for one hour at 200° F. and then overnight at room temperature was tested for bleeding, odor, and fire retardance. Properties of this product are listed below with reference to Example 6A. The other samples to which different amounts of amides were added had the bromine contents (based on the weight of treated polyurethane) and properties listed below.

| Example | Percent Br. | Bleeding | Odor | Fire Retardance |
|---|---|---|---|---|
| 6A | 5.04 | None | None | Self extinguishing. |
| B | 6.15 | None | None | Self extinguishing |
| C | 8.2 | None | None | Does not burn. |
| D | 10.25 | None | None | Does not burn. |
| Control | 0.0 | None | None | Burns fiercely. |

As the above table shows, Examples A and B will start a flame when a Bunsen burner is used to ignite them, but these flames will extinguish themselves immediately. Examples C and D will not start a flame but will only burn if a burner is held directly on them.

EXAMPLE XI

*Rigid urethane foam with fire retardant*

In this formulation a rigid foam formulation is used as follows:

G–2410 [1] _________________ 50.0
Mondur TD–80 _________________ 41.0
Water _________________ 1.45
Dabco _________________ 0.20
Silicone L–520 _________________ 0.25

[1] Sorbitol-based polyether with hydroxyl number of 495.

The brominated amide of Example II was used by premixing with the G–2410. The brominated-amide, G–2410 and TD–80 were mixed one minute, then the Dabco, Silicone L-520 and water were added and stirred 5 seconds. Then this was poured into a mold about 4 x 12 x 6 inches. The table below shows the fire-retardant characteristics of bromine contents of polyurethanes containing different amounts of the bromoamides in this foamed material.

| Example | Br Percent | Flame Resistance |
|---|---|---|
| 7A | 6.15 | Fair. |
| B | 8.2 | Good. |
| C | 12.30 | Excellent. |
| Control | 0.0 | Burns fiercely. |

The invention is covered in the claims which follow. What I claim is:

1. Amides of the formula in which R is a naturally occuring fatty chain halogenated with bromine alone or with bromine and chlorine, and containing at least one pair of bromine substituents, the bromine atoms of each pair being on adjacent carbon atoms, with chlorine if present on adjacent carbon atoms, R' is from the class consisting of hydrogen and alkyl groups containing 1 to 4 carbon atoms and R" is an alkyl group containing 1 to 8 carbon atoms; the total number of carbon atoms in R' and R" being not over 8.

2. The amides of claim 1 in which R contains at least 17 carbon atoms.
3. The amides of claim 1 in which R contains at least 4 bromine atoms.
4. The amides of claim 1 which are amides of fish oil fatty acids.
5. N,N-dimethyl 9,10-dibromostearamide.
6. N,N-dimethyl 9,10,12,13-tetrabromostearamide.
7. N,N-dimethyl hexabromostearamide.
8. N-methyl 9,10-dibromostearamide.
9. N,N-dimethyl 12,13-dibromo, 9,10-dichlorostearamide.
10. A bromine-containing alkyl-substituted amide of a fatty acid oil or fat composition which has a content of at least 25 percent of carbon-bound bromine, said alkyl substitution including a total of 1 to 8 carbon atoms.
11. The N,N-dimethyl composition of claim 10.
12. A bromine-containing N,N-dimethyl amide composition from soyabean-oil fatty acid, molecules of which contain two, four and six bromine atoms, the amide composition having a total bromine content of over 35 percent.
13. A bromine-containing N,N-dimethyl amide composition from linseed-oil fatty acid, molecules of which contain two, four and six bromine atoms, the amide composition having a total bromine content of over 40 percent.
14. A bromine-containing fatty acid amide composition with a bromine content of over 25 percent which is composed largely of a mixture of amides of naturally-occurring fatty acids brominated with an even number of bromine atoms on each amide molecule, and which includes unbrominated amides of naturally-occurring saturated fatty acids, subtsantially all of which amides are alkyl-substituted on the nitrogen, the number of carbon atoms substituted on the nitrogen not exceeding 8.
15. The N,N-dimethyl composition of claim 14.
16. In the process of brominating an amide of the class consisting of mono- and dialkyl fatty acid amide, the step of brominating with bromine the amide in solution in a solvent of the class consisting of water-soluble, liquid alcohols which suppresses formation of free fatty acid.

References Cited by the Examiner

UNITED STATES PATENTS

| | | | |
|---|---|---|---|
| 2,866,774 | 12/1958 | Price | 260—77.5 |
| 2,877,246 | 3/1959 | Schurman | 260—404 |
| 2,929,800 | 3/1960 | Hill | 260—77.5 |
| 3,006,934 | 10/1961 | Dieckelmann | 260—404 |
| 3,024,260 | 3/1962 | Ernst | 260—404 |
| 3,028,403 | 4/1962 | Fritz et al. | 260—404 X |
| 3,107,258 | 10/1963 | Lamburti et al. | 260—404 |

FOREIGN PATENTS

37/11,810   8/1962   Japan.

CHARLES B. PARKER, *Primary Examiner.*

LEON J. BERCOVITZ, *Examiner.*

M. C. JACOBS, A. H. SUTTO, *Assistant Examiners.*